(12) United States Patent
Hoshi et al.

(10) Patent No.: US 10,587,330 B2
(45) Date of Patent: Mar. 10, 2020

(54) RECEPTION DEVICE AND WIRELESS COMMUNICATION SYSTEM

(71) Applicant: HITACHI KOKUSAI ELECTRIC INC., Tokyo (JP)

(72) Inventors: Daiki Hoshi, Tokyo (JP); Tatsuhiro Nakada, Tokyo (JP); Kei Ito, Tokyo (JP); Hiroki Kato, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 0 days.

(21) Appl. No.: 16/486,968

(22) PCT Filed: Feb. 21, 2018

(86) PCT No.: PCT/JP2018/006212
§ 371 (c)(1),
(2) Date: Aug. 19, 2019

(87) PCT Pub. No.: WO2018/159412
PCT Pub. Date: Sep. 7, 2018

(65) Prior Publication Data
US 2020/0036432 A1 Jan. 30, 2020

(30) Foreign Application Priority Data
Feb. 28, 2017 (JP) ................. 2017-036053

(51) Int. Cl.
*H04B 7/08* (2006.01)
*H04B 7/0413* (2017.01)
*H04L 1/00* (2006.01)

(52) U.S. Cl.
CPC ......... *H04B 7/0874* (2013.01); *H04B 7/0413* (2013.01); *H04L 1/0041* (2013.01); *H04L 1/0048* (2013.01); *H04L 1/0054* (2013.01)

(58) Field of Classification Search
CPC ... H04B 7/0874; H04B 7/0413; H04L 1/0041; H04L 1/0048; H04L 1/0054
See application file for complete search history.

(56) References Cited

U.S. PATENT DOCUMENTS 7,006,810 B1 2/2006 Winters et al.
7,469,014 B2 12/2008 Abe et al.
(Continued)

FOREIGN PATENT DOCUMENTS

JP 2006-50532 A 2/2006
JP 2008-28750 A 2/2008
(Continued)

OTHER PUBLICATIONS

International Search Report dated May 22, 2018.
(Continued)

*Primary Examiner* — Janice N Tieu
(74) *Attorney, Agent, or Firm* — Bacon & Thomas, PLLC (57) ABSTRACT

A reception device including reception antennas is provided. In the reception device, a demodulation unit is configured to calculate, for each of a plurality of antenna combinations of the reception antennas, log likelihood ratios of coded bits of error correction code obtained from reception signals of the reception antennas. A mutual information amount calculation unit is configured to calculate an average mutual information amount based on the log likelihood ratios corresponding to each of the antenna combinations. An antenna combination selection unit is configured to output determination information for specifying one of the antenna combinations for which the average mutual information amount is the maximum. A signal selection unit is configured to select the log likelihood ratios corresponding to the specified antenna combination based on the determination informa- (Continued)

tion, and a decoding unit is configured to decodes the selected log likelihood ratios.

4 Claims, 3 Drawing Sheets

(56) References Cited

U.S. PATENT DOCUMENTS

| | | | |
|---|---|---|---|
| 8,238,273 B2 | 8/2012 | Shimizu et al. | |
| 8,238,488 B1* | 8/2012 | Lee | H04L 25/03331 375/262 |
| 8,494,080 B2 | 7/2013 | Yokomakura et al. | |
| 8,630,268 B2 | 1/2014 | Tamaki | |
| 2010/0266065 A1* | 10/2010 | Yokomakura | H04L 1/0003 375/285 |
| 2011/0116581 A1* | 5/2011 | Yamada | H04B 7/0413 375/341 |
| 2012/0087431 A1* | 4/2012 | Liu | H04B 7/0874 375/267 |
| 2018/0034521 A1* | 2/2018 | Asakura | G01S 7/295 |

FOREIGN PATENT DOCUMENTS

| | | |
|---|---|---|
| JP | 2010-87707 A | 4/2010 |
| JP | 2012-114700 A | 6/2012 |
| WO | WO2009/081860 A | 7/2009 |
| WO | WO2016/186000 A | 11/2016 |

OTHER PUBLICATIONS

Choi, Yang-Seok et al., Fast algorithms for antenna selection on MIMO systems, IEEE VTC 2003 Fall, vol. 3, 2003, pp. 1733-1737.
Keisuke Harada etc. of "A Forward Error Correction Method for OFDM Transmission Considering Terrestrial Channel Characteristics", Proceedings of the 1998 ITE Annual Convention.

* cited by examiner

RECEPTION DEVICE AND WIRELESS COMMUNICATION SYSTEM

TECHNICAL FIELD

The present invention relates to a reception device including a plurality of reception antennas and a wireless communication system, and more particularly to a reception device and a wireless communication system capable of preventing transmission quality from being deteriorated by selecting an optimum antenna combination.

BACKGROUND

Description of Prior Art

With the spread of digital transmission systems transmitting digitally modulated signals, a wireless transmission device or a transmission system is able to transmit a larger amount of information than an analog transmission.

Recently, as the required transmission rate has been increasing, a multiple input multiple output (MIMO) technique has been suggested as a signal processing technique for improving the transmission rate using antennas both for a transmission device and a reception device.

In MIMO, transmission data (stream) is divided into a plurality of signals (substreams) on a transmission side, the substreams are simultaneously transmitted from the transmission antennas and received by a plurality of reception antennas on a reception side.

Although the substreams from the respective transmission antennas interfere with each other in the signals received by the respective reception antennas, an increase in the transmission rate is realized by separating and detecting the substreams.

In a distributed antenna system that receives the signals at a plurality of reception nodes and collects the reception signals of the respective reception antennas at a control station to detect MIMO signals, it is necessary to select the reception antennas for use in MIMO demodulations due to constraint such as a calculation scale required for reception processing.

Therefore, it is desirable to realize the communication with a low bit error rate by selecting an antenna combination that can increase reception characteristics after the MIMO demodulations from the reception signal of the reception antenna at each reception node.

Conventionally, reception power measured on the reception side, a received carrier-to-noise power ratio (CNR) and the like are generally used as indices to select the antenna combination.

Further, in a case where it is necessary to select a transmission antenna to be used for feedback transmission in a two-way radio system, for example, if a duplex scheme is a time division duplex method, there is a technique in which the same combination as the reception antenna combination is selected for the transmission antenna based on the CNR described above by using duality of a propagation channel.

Meanwhile, in the MIMO transmission system, it is well-known that transmission quality deteriorates in an environment where the antenna correlation is high because the reception signal is hard to separate and detect.

Related Art

In addition, as examples of conventional techniques for an antenna combination selection, there are proposed Japanese Patent Application Publication No. 2012-114700 of "DISTRIBUTED ANTENNA SYSTEM, DISTRIBUTED ANTENNA SWITCHING METHOD, BASE STATION APPARATUS AND ANTENNA SWITCHING DEVICE" (Hitachi, Ltd., Patent Document 1), International Application Publication No. WO 2009/081860 of "RADIO COMMUNICATION SYSTEM, RECEPTION DEVICE, AND RECEPTION METHOD" (Kazunari YOKOMAKURA, etc., Patent Document 2), Japanese Patent Application Publication No. 2010-87707 "TRANSMISSION/RECEPTION SYSTEM AND MOBILE COMMUNICATION METHOD" (Sharp Corporation, Patent Document 3), and Keisuke HARADA etc. of "A FORWARD ERROR CORRECTION METHOD FOR OFDM TRANSMISSION CONSIDERING TERRESTRIAL CHANNEL CHARACTERISTICS", Proceedings of the 1998 ITE Annual Convention (Non-Patent Document 1).

Patent Document 1 discloses a technique for selecting a group of distributed antennas as antenna clusters in descending order of received power and performing MIMO signal detection on the selected reception signals.

Patent Document 2 discloses a technique for selecting a coding rate and a modulation scheme by using a mutual information amount when an equalization unit that compensates for distortion caused by a propagation channel and a decoding unit that performs error correction repeat processings to detect data before coding in the reception device.

Patent Document 3 discloses a technique for calculating a mutual information amount from the reliability of a transmission bit through a reception signal after equalization, setting a modulation scheme or a coding rate based on the mutual information amount, and notifying a transmission device of the same.

Non-Patent Document 1 discloses a study on error correction adapted to a channel condition caused by multipath fading and co-channel interference.

Patent Document 1: Japanese Patent Application Publication No. 2012-114700

Patent Document 2: International Application Publication No. WO 2009/081860

Patent Document 3: Japanese Patent Application Publication No. 2010-87707

Non-Patent Document 1: Keisuke HARADA etc. of "A FORWARD ERROR CORRECTION METHOD FOR OFDM TRANSMISSION CONSIDERING TERRESTRIAL CHANNEL CHARACTERISTICS", Proceedings of the 1998 ITE Annual Convention However, the conventional reception device and the conventional wireless communication system are problematic in that when an antenna combination is selected based on the reception power and the received CNR, a combination with high antenna correlation is selected. Therefore, a bit error rate deteriorates.

Further, in a two-way radio system, when the antenna selected by the reception device is used as a transmission antenna, duality of a propagation channel causes a propagation channel of a feedback transmission to also have a high antenna correlation.

Therefore, when the combination with high antenna correlation is selected on the reception side, there arises a problem that the bit error rate deteriorates also in the feedback transmission.

SUMMARY

In view of the above, the present invention provides a reception device and a wireless communication system capable of preventing a bit error rate from deteriorating by selecting an optimum antenna combination in consideration of an antenna correlation.

In accordance with an embodiment of the present invention, there is provided a reception device having a plurality of reception antennas, the reception device including: a demodulation unit configured to calculate, for each of a plurality of antenna combinations of the reception antennas, log likelihood ratios of coded bits of error correction code obtained from reception signals of the reception antennas; a mutual information amount calculation unit configured to calculate an average mutual information amount based on the log likelihood ratios corresponding to each of the antenna combinations; an antenna combination selection unit configured to output determination information for specifying one of the antenna combinations for which the average mutual information amount is the maximum; a signal selection unit configured to select the log likelihood ratios corresponding to the specified antenna combination based on the determination information; and a decoding unit configured to decode the selected log likelihood ratios.

Further, the reception device described above may further include an interference detection unit configured to detect a signal component, including an interference wave component, for each of the reception signals of the reception antennas and a loss correction unit configured to perform a processing of removing the signal component detected by the interference detection unit. The loss correction unit may perform the processing on the reception signals when the interference detection unit and the loss correction unit are provided in a front end of the demodulation unit, and the loss correction unit may perform the processing on the log likelihood ratios outputted from the demodulation unit when the interference detection unit and the loss correction unit are provided in a back end of the demodulation unit.

In accordance with another embodiment of the present invention, there is provided a wireless communication system including: a transmission device configured to perform error correction coding on input information bits to generate coded bits, digitally modulate the coded bits, and transmit the modulated coded bits; and the reception device described above.

In accordance with another embodiment of the present invention, there is provided a wireless communication system including: a transmission device configured to perform error correction coding on input information bits to generate coded bits, digitally modulate the coded bits, and transmit the modulated coded bits; and the reception device described above.

Effect

According to the present invention, a reception device having a plurality of reception antennas comprises: a demodulation unit configured to calculate, for each of a plurality of antenna combinations of the reception antennas, log likelihood ratios of coded bits of error correction code obtained from reception signals of the reception antennas; a mutual information amount calculation unit configured to calculate an average mutual information amount based on the log likelihood ratios corresponding to each of the antenna combinations; an antenna combination selection unit configured to output determination information for specifying one of the antenna combinations for which the average mutual information amount is the maximum; a signal selection unit configured to select the log likelihood ratios corresponding to the specified antenna combination based on the determination information; and a decoding unit configured to decodes the selected log likelihood ratios.

Therefore, it is possible to prevent a bit error rate from deteriorating since an antenna combination is selected and decoded by considering and reflecting an influence of the antenna correlation of a propagation channel or an influence of the number of spatial multiplexing.

Further, according to the present invention, the reception device further includes an interference detection unit configured to detect a signal component including an interference wave component for each of the reception signals of the reception antennas and a loss correction unit configured to perform a processing of removing the signal component detected by the interference detection unit. Further, the loss correction unit performs the processing on the reception signals when the interference detection unit and the loss correction unit are provided in a front end of the demodulation unit, and the loss correction unit performs the processing on the log likelihood ratios outputted from the demodulation unit when the interference detection unit and the loss correction unit are provided in a back end of the demodulation unit.

Therefore, a subcarrier signal with a large influence of an interference signal and low reliability is not decoded, so that it is possible to improve reception characteristics.

DETAILED DESCRIPTION

Embodiments of the present invention will be described with reference to the drawings.

Overview of Embodiments

In a reception device (the claimed reception device) and a wireless communication system (the claimed wireless communication system) according to the embodiments of the present invention, the reception device includes a plurality of antennas. A demodulation unit calculates, for each combination of antennas (antenna combination), log likelihood ratios of coded bits (hereinafter, referred to as "coded bit LLRs") of error correction code from reception signals. A mutual information amount calculation unit calculates mutual information amounts for the coded bit LLRs and averages the mutual information amounts to obtain an average mutual information amount. The signal selection unit selects a demodulation signal based on an antenna combination having the maximum average mutual information amount, and a decoding unit decodes the selected demodulation signal. With such configuration, the antenna combination in which an influence of antenna correlation of a propagation channel or an influence of the number of spatial multiplexing is considered and reflected can be selected. Therefore, it is possible to prevent a bit error rate from deteriorating.

Further, in the reception device and the wireless communication system according to the embodiments of the present invention, an interference detection unit and a loss correction unit are provided in a front end of the demodulation unit. The interference detection unit detects, for each reception signal, a subcarrier in which an interference wave is mixed, and the loss correction unit removes a signal of the subcarrier when an interfered power of the subcarrier is larger than a threshold. Accordingly, a subcarrier signal with low reliability is excluded from a decoding target, and thus, it is possible to prevent reception characteristics from deteriorating.

<Wireless Communication System According to Embodiment>

A wireless communication system according to an embodiment of the present invention is a MIMO transmission system including a transmission device and a reception device, each having two or more antennas.

At a transmission device side, a data stream is divided into two substreams, and the two substreams are transmitted from two antennas, respectively.

Hereinafter, the MIMO transmission system including two transmission antennas and three reception antennas will be described, but the present embodiment may be applied to a MIMO transmission system including two or more transmission antennas and three or more reception antennas and a single input multiple output (SIMO) transmission system including a reception device only having three or more antennas.

Figure 1:
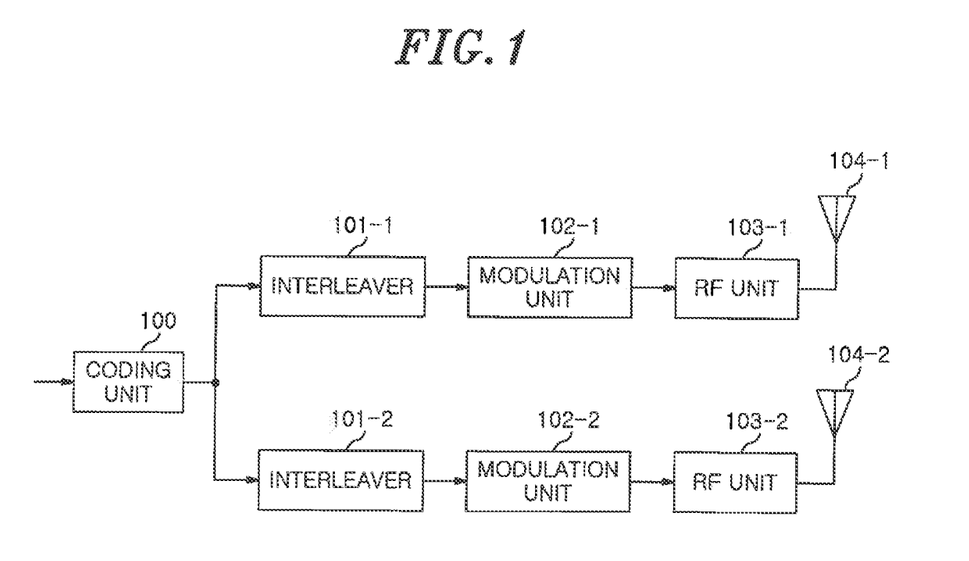
FIG. 1 is a block diagram showing a configuration of the transmission device.

<Configuration of Transmission Device According to Embodiment: FIG. 1>

A transmission device according to the embodiment of the present invention will be described with reference to FIG. 1. FIG. 1 is a block diagram showing a configuration of the transmission device. The transmission device is used in combination with a first reception device or a second reception device that will be described later and configures the wireless communication system according to the embodiment.

As illustrated in FIG. 1, the transmission device includes a coding unit 100, interleavers 101-1 and 101-2, modulation units 102-1 and 102-2, radio frequency (RF) units 103-1 and 103-2, and antennas 104-1 and 104-2.

The coding unit 100 is configured to perform error correction coding on input information bits and output the coded bits.

The interleavers 101-1 and 101-2 are configured to perform sorting processing on the coded bits.

The modulation units 102-1 and 102-2 are configured to perform digital modulation processing on the coded bits.

The RF units 103-1 and 103-2 are configured to up-convert an input baseband signal into a carrier frequency band.

The antennas 104-1 and 104-2 are configured to transmit radio signals.

An operation of the transmission device will be briefly described.

In the transmission device, an information bit array that is a transmission target to be transmitted is inputted to the coding unit 100. The coding unit 100 performs error correction coding on the information bit array. The interleavers 101-1 and 101-2 perform sorting processing of the coded bits, and the modulation units 102-1 and 102-2 perform modulation processing of the coded bits.

Then, base band signals are up-converted to signals of a carrier frequency band by the RF units 103-1 and 103-2 and are transmitted as radio signals from the antennas 104-1 and 104-2.

Figure 2:
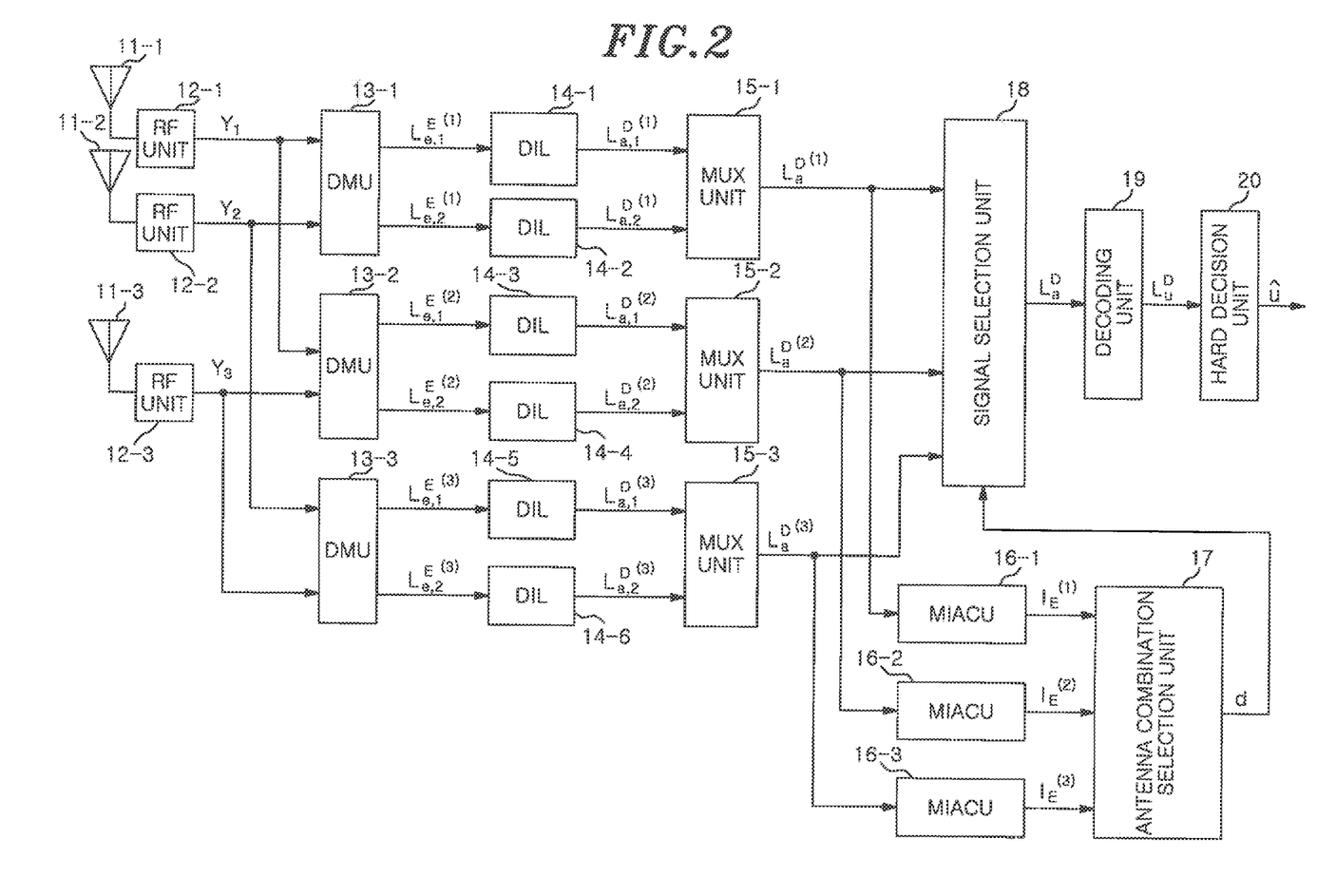
FIG. 2 is a block diagram showing a configuration of a first reception device.

<Configuration of Reception Device According to First Embodiment: FIG. 2>

Next, a reception device (first reception device) according to a first embodiment of the present invention will be described with reference to FIG. 2. FIG. 2 is a block diagram showing a configuration of the first reception device.

As illustrated in FIG. 2, the first reception device is a MIMO reception device including a reception channel 1, a reception channel 2, and a reception channel 3.

Specifically, the first reception device includes antennas 11 (11-1, 11-2, and 11-3), RF units 12 (12-1, 12-2, and 12-3), and demodulation units (DMU) 13 (13-1, 13-2, and 13-3), deinterleavers (DIL) 14 (14-1, 14-2, 14-3, 14-4, 14-5, and 14-6), multiplexer (MUX) units 15 (15-1, 15-2, and 15-3), mutual information amount calculation units (MIACU) 16 (16-1, 16-2, and 16-3), an antenna combination selection unit 17, a signal selection unit 18, a decoding unit 19, and a hard decision unit 20.

Each unit of the first reception device will be described.

<Antenna 11>

Each of the antennas 11 is configured to receive a radio signal of a carrier frequency band.

The antenna 11-1 is provided for the reception channel 1, the antenna 11-2 is provided for the reception channel 2, and the antenna 11-3 is provided for the reception channel 3.

<RF Unit 12>

Each of the RF units 12 is configured to down-convert the signal of the carrier frequency band received by the antenna 11 into a baseband signal.

The RF unit 12-1 obtains a reception signal $Y_1$ from a radio signal received by the antenna 11-1.

Similarly, the RF unit 12-2 obtains a reception signal $Y_2$ from a radio signal received by the antenna 11-2, and the RF unit 12-3 obtains a reception signal $Y_3$ from a radio signal received by the antenna 11-3.

The subscripts '1', '2', and '3' indicate the reception channel 1, the reception channel 2, and the reception channel 3, respectively.

<Demodulation Unit 13>

Each of the demodulation units 13 is configured to receive reception signals of two reception channels corresponding to an antenna combination and calculate a coded bit log likelihood ratio (LLR) for each reception channel. Since the first reception device has three reception channels, there are three combinations (antenna combinations) of the reception channels.

Here, the coded bit indicates a bit obtained by performing error correction coding. In contrast, a bit for which the error correction coding is not performed is called an information bit.

Further, the coded bit LLR is defined as a value obtained by a logarithm conversion of the ratio between the likelihood of "0" and the likelihood of "1" for the code bit.

The demodulation unit 13-1 is provided to correspond to an antenna combination 1 (the antenna 11-1 and the antenna 11-2) and is configured to receive the reception signals $Y_1$ and $Y_2$, calculate a coded bit LLR ($L_{p,1}^{E(1)}$) for the reception signal $Y_1$, and calculate a coded bit LLR ($L_{p,2}^{E(1)}$) for the reception signal $Y_2$.

Further, the demodulation unit 13-2 is provided to correspond to an antenna combination 2 (the antenna 11-1 and the antenna 11-3) and is configured to receive the reception signals $Y_1$ and $Y_3$, calculate a coded bit LLR ($L_{p,1}^{E(2)}$) for the reception signal $Y_1$, and calculate a coded bit LLR ($L_{p,2}^{E(2)}$) for the reception signal $Y_2$.

Further, the demodulation unit 13-3 is provided to correspond to an antenna combination 3 (the antenna 11-2 and the antenna 11-3) and is configured to receive the reception signals $Y_2$ and $Y_3$, calculate a coded bit LLR ($L_{p,1}^{E(3)}$) for the reception signal $Y_2$, and calculate a coded bit LLR ($L_{p,2}^{E(3)}$) for the reception signal $Y_3$.

A subscript 'i' of the coded bit LLR ($L_{p,i}^{E(j)}$) indicates a stream reference number, and a subscript 'j' indicates an antenna combination reference number. Further, a subscript 'p' indicates the initial for posterior.

Meanwhile, although an example in which the demodulation units 13 are parallelized is described here, demodulation processing may be performed by time division using one demodulation unit to detect a MIMO signal for each combination of the antennas.

A method of calculating the coded bit LLR will be briefly described.

For example, the coded bit LLR may be obtained by using a distance between the reception signal and a replica (an ideal reception node calculated from a transmission channel estimation result) in maximum likelihood detection (MLD), which is a type of a demodulation method.

Alternatively, the coded bit LLR may also be calculated even in demodulation methods that are MIMO signal detection methods such as zero forcing (ZF) or minimum mean square error (MMSE).

Each of the demodulation unit 13 calculates the coded bit LLR ($L_{e,i}^{E(1)}$) (output LLR), which becomes an output of the corresponding demodulation unit 13, from the coded bit LLR ($L_{p,i}^{E(j)}$) of the received stream. The subscript 'e' indicates the initial for extrinsic.

Here, since there is no prior information for a transmission signal, the output LLR of the demodulation unit 13 is equivalent to the previously calculated coded bit LLR.

Therefore, a relationship is established as follows:

$$L_{e,1}^{E(1)}=L_{p,1}^{E(1)}, L_{e,2}^{E(1)}=L_{p,2}^{E(1)},$$

$$L_{e,1}^{E(2)}=L_{p,1}^{E(2)}, L_{e,2}^{E(2)}=L_{p,2}^{E(2)},$$

$$L_{e,1}^{E(3)}=L_{p,1}^{E(3)}, L_{e,2}^{E(3)}=L_{p,2}^{E(3)},$$

<Deinterleaver 14>

Each of the deinterleavers 14 is configured to perform sorting processing on the output stream (output LLR of the demodulation unit 13) from the demodulation unit 13 so as to return the interleaving performed by the transmission device to an original order.

Specifically, the deinterleaver 14-1 sorts the output LLR ($L_{e,1}^{E(1)}$) and outputs the deinterleaved output LLR ($L_{a,1}^{D(1)}$).

The deinterleaver 14-2 sorts the output LLR ($L_{e,2}^{E(1)}$) and outputs the deinterleaved output LLR ($L_{a,2}^{D(1)}$).

The deinterleaver 14-3 sorts the output LLR ($L_{e,1}^{E(2)}$) and outputs the deinterleaved output LLR ($L_{a,1}^{D(2)}$).

The deinterleaver 14-4 sorts the output LLR ($L_{e,2}^{E(2)}$) and outputs the deinterleaved output LLR ($L_{a,2}^{D(2)}$).

The deinterleaver 14-5 sorts the output LLR ($L_{e,1}^{E(3)}$) and outputs the deinterleaved output LLR ($L_{a,1}^{D(3)}$).

The deinterleaver 14-6 sorts the output LLR ($L_{e,2}^{E(3)}$) and outputs the deinterleaved output LLR ($L_{a,2}^{D(3)}$).

<Multiplexer Unit 15>

Each of the multiplexer units 15 sorts the two input coded bit LLRs to return the inter-channel distribution processing performed by the transmission device to an original order.

Specifically, the multiplexer 15-1 receives the deinterleaved LLR ($L_{a,1}^{D(1)}$) and the deinterleaved LLR ($L_{a,2}^{D(1)}$) and sorts and integrates the received deinterleaved LLRs to generate the coded bit LLR ($L_a^{D(1)}$) corresponding to the antenna combination 1. Thereafter, the generated coded bit LLR ($L_a^{D(1)}$) is outputted to the signal selection unit 18 and the mutual information amount calculation unit 16-1.

The multiplexer 15-2 receives the deinterleaved LLR ($L_{a,1}^{D(2)}$) and the deinterleaved LLR ($L_{a,2}^{D(2)}$) and sorts and integrates the received deinterleaved LLRs to generate the coded bit LLR ($L_a^{D(2)}$) corresponding to the antenna combination 2. Thereafter, the generated coded bit LLR ($L_a^{D(2)}$) is outputted to the signal selection unit 18 and the mutual information amount calculation unit 16-2.

Further, the multiplexer 15-3 receives the deinterleaved LLR ($L_{a,1}^{D(3)}$) and the deinterleaved LLR ($L_{a,2}^{D(3)}$) and sorts and integrates the received deinterleaved LLRs to generate the coded bit LLR ($L_a^{D(3)}$) corresponding to the antenna combination 3. Thereafter, the generated coded bit LLR ($L_a^{D(3)}$) is outputted to the signal selection unit 18 and the mutual information amount calculation unit 16-3.

<Mutual Information Amount Calculation Unit 16>

Each of the mutual information amount calculation units 16 is configured to calculate a mutual information amount based on the output LLR corresponding to each antenna combination and average the mutual information amount to output an average mutual information amount corresponding to each antenna combination.

The mutual information amount becomes smaller as an error of a transmission channel increases.

Since the mutual information amount for the output LLR is an instantaneous value, the mutual information amount has a large deviation. Therefore, the mutual information amount calculation unit 16 outputs the average mutual information amount with less deviation by taking a sample average for the number of coded bits N (N is a natural number).

The mutual information amount calculation unit 16-1 calculates an average mutual information amount $I_E^{(1)}$ from the output LLR ($L_a^{D(1)}$) corresponding to the antenna combination 1 and outputs the calculated average mutual information amount to the antenna combination selection unit 17.

Similarly, the mutual information amount calculation unit 16-2 calculates an average mutual information amount $I_E^{(2)}$ from the output LLR ($L_a^{D(2)}$) corresponding to the antenna combination 2 and outputs the calculated average mutual information amount to the antenna combination selection unit 17. The mutual information amount calculation unit 16-3 calculates an average mutual information amount $I_E^{(3)}$ from the output LLR ($L_a^{D(3)}$) corresponding to the antenna combination 3 and outputs the calculated average mutual information amount to the antenna combination selection unit 17.

A method of calculating the mutual information amount from the output LLR corresponding to the antenna combination will be described later in detail.

<Antenna Combination Selection Unit 17>

The antenna combination selection unit 17 is configured to receive the average mutual information amounts ($I_E^{(1)}$, $I_E^{(2)}$, and $I_E^{(3)}$) calculated according to the antenna combinations inputted from the mutual information amount calculation units 16-1, 16-2, and 16-3 and select the antenna combination of the largest average mutual information amount to output determination information d. For example, if $I_E^{(1)}=0.8$, $I_E^{(2)}=0.4$, and $I_E^{(3)}=0.6$, the antenna combination selection unit 17 outputs the determination information d, which indicates that the antenna combination 1 is determined as an optimum antenna combination, to the signal selection unit 18 such that the signal selection unit 18 selects the output LLR corresponding to the antenna combination 1 from the multiplexer unit 15-1.

<Signal Selection Unit 18>

The signal selection unit 18 is configured to select any one of the output LLRs of the multiplexer units 15-1, 15-2, and 15-3 on the basis of the determination information d and outputs the selected output LLR ($L_a^D$) to a decoding unit 19 in a back end.

<Decoding Unit 19>

The decoding unit 19 is configured to decode the input coded bit LLR ($L_a^D$) by using, for example, maximum posterior probability decoding and the like and calculate an output information bit LLR ($L_u^D$) of the decoding unit 19 to output the output information bit LLR.

<Hard Decision Unit 20>

The hard decision unit 20 is configured to output, based on the output information bit LLR ($L_u^D$), a decoding result obtained by determination processing such as a hard decision.

<Calculation of Mutual Information>

Next, calculation processing of the mutual information amount from the mutual information amount calculation unit 16 will be described.

The mutual information amount I(X;Y) indicates an information amount for a probability variable X obtained through observing an event Y. That is, the mutual information amount I(X;Y) quantitatively indicates how much information of the probability variable X is included in the event Y, and is represented by the following equation 1:

$$I(X;Y) = H(X) - H(X|Y) \quad \text{(Equation 1)}$$

where H(X) is called a prior entropy in the mutual information amount, and H(X|Y) is called a posterior entropy.

The mutual information amount I(X;Y) in the reception device according to the embodiment is "in the case where the transmission signal is X and the reception signal is Y, the information amount on the transmission signal X that can be observed when the received signal Y is obtained."

As a first method of calculating the mutual information amount in the mutual information amount calculation unit 16, a method disclosed in Patent Document 2 may be used in such a manner that the mutual information amount is obtained from the bit LLR under an assumption that the mutual information amount is based on an ergodic property that a time average and an ensemble average are identical and a consistency condition that occurrence probabilities of "0" and "1" are identical and a distribution follows an identical and symmetric Gaussian distribution.

The mutual information amount when the bit LLR is obtained is represented by the following equation 2:

$$I_X = 1 - \frac{2}{K_B} \sum_{k=1}^{K_B} \frac{\log_2(1 + \exp(l_k))}{1 + \exp(l_k)} \quad \text{(Equation 2)}$$

where $I_x$ is a mutual information amount represented by a real number between 0 and 1, $K_B$ is a bit length, and $1_K$ is a bit LLR of a k-th bit.

In the first method, the mutual information amount I for each antenna combination is obtained and averaged in this manner, so that an average mutual information amount is calculated.

As a second method, a method disclosed in Patent Document 3 may be used in such a manner that the mutual information amount is obtained by using a variance and a J function.

A variance $\sigma_1^2$ of the coded bit LLR is represented by the following equation 3 using an equalization amplitude gain:

$$\sigma_l^2 = \frac{4\mu_z}{1 - \mu_z} \quad \text{(Equation 3)}$$

where $\sigma_1^2$ is a positive real number.

The variance and mutual information amount of the coded bit LLR can be converted from each other and can be represented similarly to the following equation 4 using an approximate expression called a J function:

$$I_Z = \left(1 - 2^{H_1 \sigma_l^{2H_2}}\right)^{H_3} \quad \text{(Equation 4)}$$

where $I_z$ represents the mutual information amount when the variance $\sigma_1^2$ of the coded bit LLR is given, and $H_1$, $H_2$, and $H_3$ are constants according to a modulation method.

When the modulation method is BPSK or QPSK, $H_1=0.3073$, $H_2=0.8935$, and $H_3=1.1064$, and when the modulation method is 16QAM, $H_1=0.2224$, $H_2=0.6783$, and $H_3=1.3617$.

In the second method, the mutual information amount I for each antenna combination is obtained and averaged in this manner, and the average mutual information amount is calculated.

<Operation of First Reception Device: FIG. 2>

Next, an operation of the first reception device will be briefly described with reference to FIG. 2.

High frequency signals received by the antennas 11-1, 11-2, and 11-3 are respectively inputted to the RF units 12-1, 12-2, and 12-3 and then are down-converted to obtain reception signals $Y_1$, $Y_2$, and $Y_3$.

The reception signal $Y_1$ is inputted to the demodulation units 13-1 and 13-2, the reception signal $Y_2$ is inputted to the demodulation units 13-1 and 13-3, and the reception signal $Y_3$ is inputted to the demodulation units 13-2 and 13-3.

The demodulation units 13-1, 13-2, and 13-3 calculate the coded bits LLRs corresponding to the respective antenna combinations 1, 2, and 3 to respectively calculate the output LLRs for the reception channels.

The output LLRs for the reception channels are respectively sorted by the deinterleavers 14-1 to 14-6, and the output LLRs $L_a^{D(1)}$, $L_a^{D(2)}$, and $L_a^{D(3)}$ corresponding to the antenna combinations 1, 2, and 3 are respectively generated by the multiplexer units 15-1, 15-2, and 15-3 and are outputted to the mutual information amount calculation units 16-1, 16-2, and 16-3 and the signal selection unit 18.

Then, the mutual information amount calculation units 16-1, 16-2, and 16-3 calculate the mutual information amounts corresponding to the antenna combinations 1, 2, and 3, respectively, and outputs the average mutual information amounts $I_E^{(1)}$, $I_E^{(2)}$, and $I_E^{(3)}$ by averaging the mutual information amounts.

Then, the antenna combination selection unit 17 selects and specifies an antenna combination in which the average mutual information amount is maximized, and the determination information d is outputted to the signal selection unit 18.

The signal selection unit 18 selects, based on the determination information d, any one of the output LLRs $L_a^{D(1)}$, $L_a^{D(2)}$, and $L_a^{D(3)}$ corresponding to the antenna combinations that are outputted from the multiplexer units 15-1, 15-2, and 15-3 and outputs the selected output LLR to the decoding unit 19.

Then, the selected output LLR is decoded by the decoding unit 19 and is determined by the hard decision unit 20 to thereby output a value of each bit.

Since input and output characteristics of the mutual information amount of the demodulation processing in the demodulation unit 13 depend on a transmission channel environment such as antenna correlation, the average mutual information amount after the demodulation processing is a value in which an influence of the antenna correlation not considered in a reception CNR or the like is reflected.

Further, when the mutual information amount calculation unit 16 calculates the average mutual information amount, a parameter regarding the antenna correlation is not required.

As described above, by selecting and decoding the antenna combinations based on the average mutual information amount, the reception device and the system according to the embodiment performs communications with a small bit error rate in association with various propagation environments.

Effect of First Embodiment

In accordance with the reception device and the wireless communication system according to the first embodiment of the present invention, the demodulation units 13-1, 13-2, and 13-3 of the reception device calculate coded bit LLRs from reception signals for respective antenna combinations. The mutual information amount calculation units 16-1, 16-2, and 16-3 calculate and average mutual information amounts of coded bit LLRs for the antenna combinations to obtain average mutual information amounts, respectively. The antenna combination selection unit 17 specifies one of the antenna combinations in which the average mutual information amount becomes the maximum and outputs determination information d therefor. The signal selection unit 18 selects a demodulation signal based on the determination information d. The decoding unit 19 decodes the selected demodulation signal so that a combination of a small antenna correlation can be selected and decoded by using the average mutual information amount as an index. Therefore, there is an effect that the bit error rate can be prevented from being reduced.

In the first reception device, although there is described a method of calculating the mutual information amount using the LLRs outputted from the deinterleaver 14, the output mutual information amount of the demodulation unit 13 and the input mutual information amount of the decoding unit 19 are equal to each other because the deinterleaver 14 and the multiplexer unit 15 connected between the demodulation unit 13 and the decoding unit 19 are provided merely for the sorting process.

Therefore, the average mutual information amount may be calculated by using the LLRs before being inputted to the deinterleaver 14 instead of the LLRs after being outputted from the deinterleaver 14.

That is, substreams from the demodulation units 13-1, 13-2, and 13-3 may be branched and inputted to the mutual information amount calculation units 16-1, 16-2, and 16-3, respectively, and the mutual information amounts of the substreams are determined respectively to calculate the average mutual information amount for each antenna combination.

Further, in the first reception device, there is described an example in which the respective LLRs of the substreams outputted from the demodulation units 13 are integrated by the multiplexer unit to calculate the average mutual information amount. However, the average mutual information amount may be calculated for each substream.

That is, each of the outputs of the deinterleavers 14-1 to 14-6 may be branched and inputted to the corresponding one of the mutual information amount calculation units 16-1, 16-2, and 16-3, and the mutual information amount of each substream is calculated to further calculate the average mutual information amount for each antenna combination.

In the first embodiment, a representative method of selecting an antenna combination is described, but another method may be used to select the antenna combination in a similar way.

For example, there is a method of calculating an average mutual information amount of a stream by combining the respective antennas and selecting the antenna combination in which a minimum average mutual information amount of each antenna combination is the maximum.

Further, the reception device may have a configuration in which the average mutual information amounts ($I_E^{(1)}$, $I_E^{(2)}$, and $I_E^{(3)}$) calculated by the mutual information calculation unit 16 is displayed on a display unit or the like to notify a user of the reception device of the average mutual information amount for each antenna combination.

Further, information on the information amount can be provided. For example, when the average mutual information amounts ($I_E^{(1)}$, $I_E^{(2)}$, and $I_E^{(3)}$) approach "0," an alarm is outputted to notify that normal reception can be achieved.

Further, in the above-described embodiment, although combinations of all antennas are subject to perform demodulation processing, demodulation processing may be performed after some combinations are extracted in the previous processing.

For example, a combination of antennas with extremely low reception power and low carrier-to-noise ratio (CNR) may be excluded.

Further, when it is necessary to select a transmission antenna on the reception device side, for example, if a duplex scheme is a time division duplex (TDD) method, the same combination as the combination of the reception antennas may be selected for the transmission antennas by using duality of the propagation channel to notify the transmission device.

Furthermore, although the above-described reception device is configured to calculate the mutual information amount from the data symbol and select the antenna combination, the mutual information amount may be calculated from a preamble, a pilot symbol, an antenna combination selection signal, and the like.

This method is particularly effective for, for example, a system which uses a native mode transmission.

When the native mode transmission is used, transmission precoding is applied to the currently selected reception antenna. Therefore, the selected reception antenna can form spatial channels orthogonal to each other, but an unselected reception antenna cannot form mutually orthogonal spatial channels. Accordingly, if antenna selection is performed based on the reception power or the reception CNR, the currently selected reception antenna remains selected.

Therefore, as described above, when the mutual information amount is calculated by using a known signal such as the preamble and the like to select the antenna combination, there is an effect that an appropriate antenna combination may be selected even if the native mode transmission in which a precoding weight is applied to a transmission signal is used.

Figure 3:
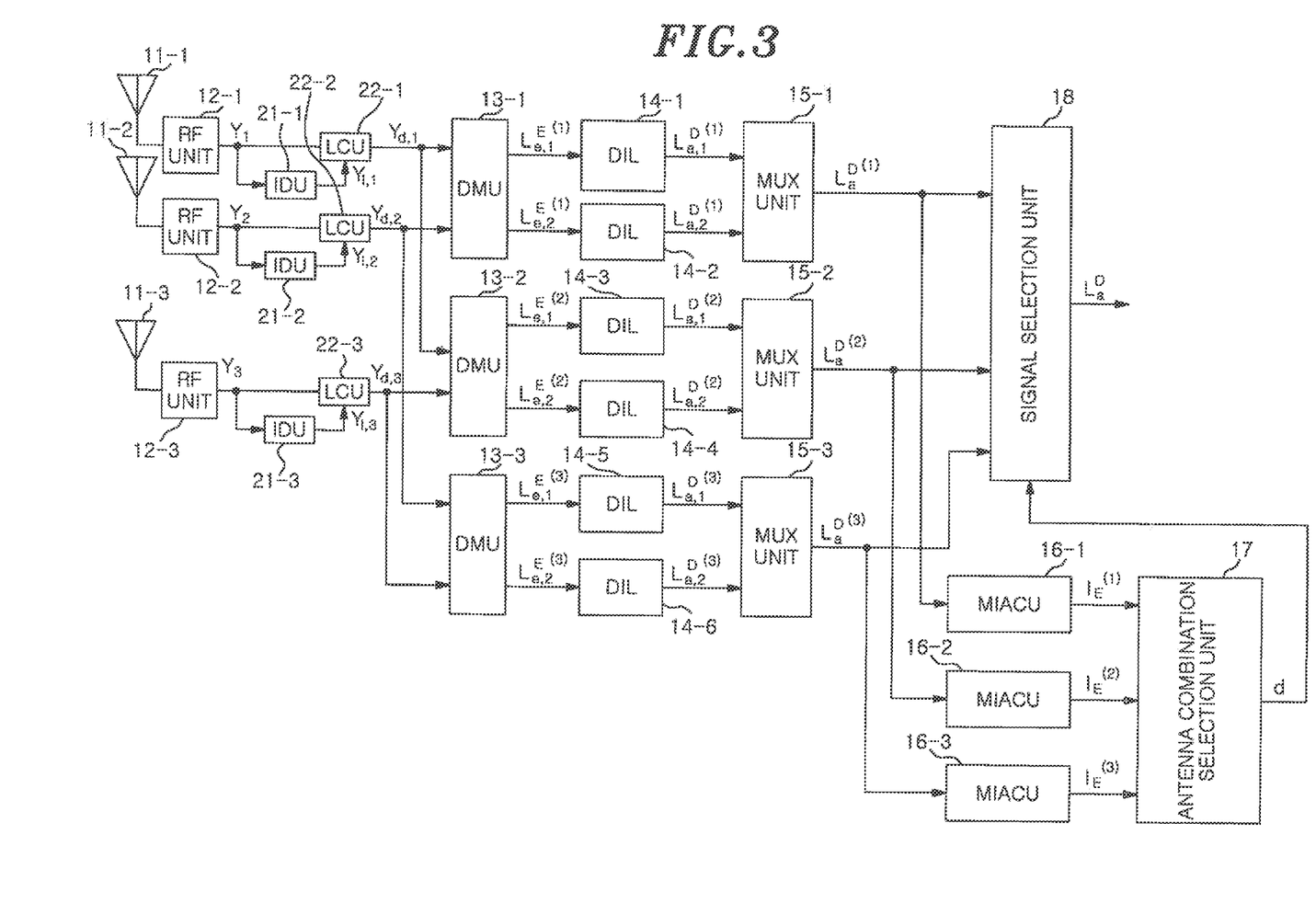
FIG. 3 is a block diagram showing a configuration of a second reception device.

<Second Reception Device: FIG. 3>

Next, a reception device (second reception device) according to a second embodiment of the present invention will be described with reference to FIG. 3. FIG. 3 is a block diagram showing a configuration of a second reception device.

The redundant descriptions of parts of the same reference numerals having the same function and configuration as in FIG. 2 will be omitted since the function and configuration thereof are the same as those of the first reception device.

Further, although a back end of the signal selection unit 18 is omitted in FIG. 3, the second reception device also includes the decoding unit 19 and the hard decision unit 20 in the same manner as in the first reception device illustrated in FIG. 2.

The second reception device is configured to include a loss correction unit for an interfered signal in order to suppress reduction of a bit error rate due to the mixing of an interference signal from other systems.

Hereinafter, a reception device receiving a signal that is modulated by using an orthogonal frequency division multiplexing (OFDM) method will be mainly described, but the present invention is also applicable to a single carrier modulation.

As illustrated in FIG. 3, the second reception device includes interference detection units (IDU) 21 (21-1, 21-2, and 21-3) configured to detect interference waves of reception signals outputted from the RF units 12, and loss correction units (LCU) 22 (22-1, 22-2, and 22-3) configured to cause a loss of a subcarrier signal in which an interference is detected.

Specifically, the interference detection unit 21-1 and the loss correction unit 22-1 are provided in the reception channel 1, the interference detection unit 21-2 and the loss correction unit 22-2 are provided in the reception channel 2, and the interference detection unit 21-3 and the loss correction unit 22-3 are provided in the reception channel 3.

The interference detection unit 21-1 detects, from the reception signal $Y_1$, a 1-th subcarrier signal $Y_{1,1}$ into which an interference wave is mixed by using carrier variance information (CVI) disclosed in, e.g., Non-Patent Document 1.

The loss correction unit 22-1 performs loss correction processing on the subcarrier signal $Y_{1,1}$ in which interference is detected when the interfered power of the subcarrier signal $Y_{1,1}$ is larger than a predetermined threshold.

In the loss correction processing, data loss processing is performed to convert $Y_{1,1}$ into "0" or "a value approximated to 0." Then, a loss corrected signal $Y_{d,1}$ after the loss correction processing is outputted to the demodulation unit 13-1. That is, the subcarrier signal that is greatly influenced by an interference wave is removed.

Similarly, the interference detection unit 21-2 detects, from the reception signal $Y_2$, a 1-th subcarrier signal $Y_{1,2}$ into which an interference wave is mixed, and the loss correction unit 22-2 performs the loss correction processing on the subcarrier signal $Y_{1,2}$ when the interfered power of the subcarrier signal $Y_{1,2}$ is larger than the predetermined threshold. Then, the loss correction unit 22-2 outputs the loss corrected signal to the demodulation unit 13-2.

Further, the interference detection unit 21-3 detects, from the reception signal $Y_3$, a 1-th subcarrier signal $Y_{1,3}$ into which an interference wave is mixed, and the loss correction unit 22-3 performs the loss correction processing on the subcarrier signal $Y_{1,3}$ when the interfered power of the subcarrier signal $Y_{1,3}$ is larger than the predetermined threshold. Then, the loss correction unit 22-3 outputs the loss corrected signal to the demodulation unit 13-2.

An operation performed after the operation of each demodulation unit 13 is the same as the operation of the first reception device, and the second reception device is also configured to select an optimum antenna combination of a small antenna correlation based on average mutual information amounts.

Generally, if an interference wave is mixed, an absolute value of the coded bit LLR decreases. However, when the loss correction processing is not performed, an erroneous recognition indicating that the coded bit LLR is high is made as the reception level increases due to interference. Therefore, a decoding result may be adversely affected.

Accordingly, in the second reception device, likelihood of a subcarrier with a low reliability due to the mixing of an interference wave can be reduced by the loss correction. Thus, the reception characteristics are improved.

Meanwhile, since the loss correction processing generates a sample in which the input LLR (output of the multiplexer unit 15) of the decoding unit becomes "0," the average mutual information amount after the loss correction processing is reduced when compared with the case where the interference wave is not mixed.

However, since the average mutual information amount is reduced in substantially the same manner in each antenna combination, the determination of the antenna combination selection unit 17 is not affected.

Further, although FIG. 3 show the configuration in which the interference detection unit 21 and the loss correction unit 22 are provided in the front end of each demodulation unit 13, the interference detection unit 21 and the loss correction unit 22 may be provided in the back end of the demodulation unit 13 to remove a subcarrier signal in which an interference wave largely affects the output LLR.

Furthermore, the interference detection unit 21 and the loss correction unit 22 may be provided in the back end of the deinterleaver 14 or in the back end of the multiplexer unit 15.

In other words, the interference detection unit 21 and the loss correction unit 22 may be provided between the deinterleaver 14 and the multiplexer unit 15 or between the multiplexer unit 15 and the mutual information amount calculation unit 16 and the signal selection unit 18.

Effect of Second Embodiment

According to the reception device and the wireless communication system according to the second embodiment, the interference detection unit 21 detects, for each reception signal, a subcarrier into which an interference wave is mixed, and the loss correction unit 22 discards the data when interfered power of the subcarrier is larger than a predetermined threshold. Therefore, a subcarrier with a low reliability is not decoded, thereby improving reception characteristics, and an optimum antenna combination of a small antenna correlation can be selected to perform decoding even when an interference signal is mixed. Thus, it becomes possible to prevent a bit error rate from deteriorating.

This application claims priority to Japanese Patent Application No. 2017-036503 filed on Feb. 28, 2017, the entire contents of which are incorporated herein by reference.

INDUSTRIAL APPLICABILITY

The present invention is suitable for a reception device and a wireless communication system that can select an optimal antenna combination to prevent transmission quality from deteriorating.

EXPLANATION OF REFERENCE NUMERALS 11, 103: antenna
12, 102: radio frequency (RF) unit
13: demodulation unit
14: deinterleaver
15: multiplexer unit
16: mutual information amount calculation unit
17: antenna combination selection unit
18: signal selection unit
19: decoding unit
20: Hard decision unit
21: interference detection unit
22: loss correction unit
100: coding unit
101: modulation unit
102: radio frequency (RF) unit

What is claimed is:

1. A reception device having a plurality of reception antennas, the reception device comprising:
    a demodulation unit configured to calculate, for each of a plurality of antenna combinations of the reception antennas, log likelihood ratios of coded bits of error correction code obtained from reception signals of the reception antennas;
    a mutual information amount calculation unit configured to calculate an average mutual information amount based on the log likelihood ratios corresponding to each of the antenna combinations;
    an antenna combination selection unit configured to output determination information for specifying one of the antenna combinations for which the average mutual information amount is the maximum;
    a signal selection unit configured to select the log likelihood ratios corresponding to the specified antenna combination based on the determination information; and
    a decoding unit configured to decode the selected log likelihood ratios.

2. The reception device of claim 1, further comprising:
    an interference detection unit configured to detect a signal component, including an interference wave component, for each of the reception signals of the reception antennas; and
    a loss correction unit configured to perform a processing of removing the signal component detected by the interference detection unit,
    wherein, the loss correction unit performs the processing on the reception signals when the interference detection unit and the loss correction unit are provided in a front end of the demodulation unit, and
    wherein the loss correction unit performs the processing on the log likelihood ratios outputted from the demodulation unit when the interference detection unit and the loss correction unit are provided in a back end of the demodulation unit.

3. A wireless communication system comprising:
    a transmission device configured to perform error correction coding on input information bits to generate coded bits, digitally modulate the coded bits, and transmit the modulated coded bits; and
    the reception device of claim 1.

4. A wireless communication system comprising:
    a transmission device configured to perform error correction coding on input information bits to generate coded bits, digitally modulate the coded bits, and transmit the modulated coded bits; and
    the reception device according to claim 2.

* * * * *